(12) United States Patent
Okamura et al.

(10) Patent No.: US 7,236,313 B2
(45) Date of Patent: Jun. 26, 2007

(54) RING ZONAL PHASE CORRECTION LENS AND OPTICAL SYSTEM AND OPTICAL HEAD DEVICE

(75) Inventors: Tetsuro Okamura, Nagano (JP); Ryoichi Shiratori, Nagano (JP)

(73) Assignee: Nidec Nissin Corporation (JP)

( * ) Notice: Subject to any disclaimer, the term of this patent is extended or adjusted under 35 U.S.C. 154(b) by 0 days.

(21) Appl. No.: 11/243,878

(22) Filed: Oct. 5, 2005

(65) Prior Publication Data

US 2006/0077568 A1 Apr. 13, 2006

(30) Foreign Application Priority Data

Oct. 8, 2004 (JP) ............................. 2004-296543

(51) Int. Cl.
 *G02B 13/18* (2006.01)
(52) U.S. Cl. ................. 359/719; 359/742; 369/112.01; 369/112.03
(58) Field of Classification Search ................ 359/618, 359/634, 637, 719, 742; 369/112.01, 112.03, 369/112.05–112.08, 112.11–112.13
See application file for complete search history.

(56) References Cited

U.S. PATENT DOCUMENTS

2004/0264343 A1* 12/2004 Hendriks et al. ...... 369/112.01

* cited by examiner

*Primary Examiner*—Scott J. Sugarman
*Assistant Examiner*—Darryl J Collins
(74) *Attorney, Agent, or Firm*—Cantor Colburn LLP

(57) ABSTRACT

A ring zonal phase correction lens made of resin is provided with a refraction face structurally formed on at least one of a first lens face and a second lens face. The refraction face includes three or more ring zonal shaped refraction curved surfaces which are formed to be adjacent to each other through step portions formed in an optical axis direction for correcting a phase of a laser beam emitted from a laser by respective ring zonal shaped refraction curved surfaces. The step portion is formed such that a lens thickness of an outer ring zonal shaped refraction curved surface becomes thicker than that of an inner ring zonal shaped refraction curved surface and the step portion is formed at a half or more outer area of an effective radius of the refraction face.

9 Claims, 6 Drawing Sheets

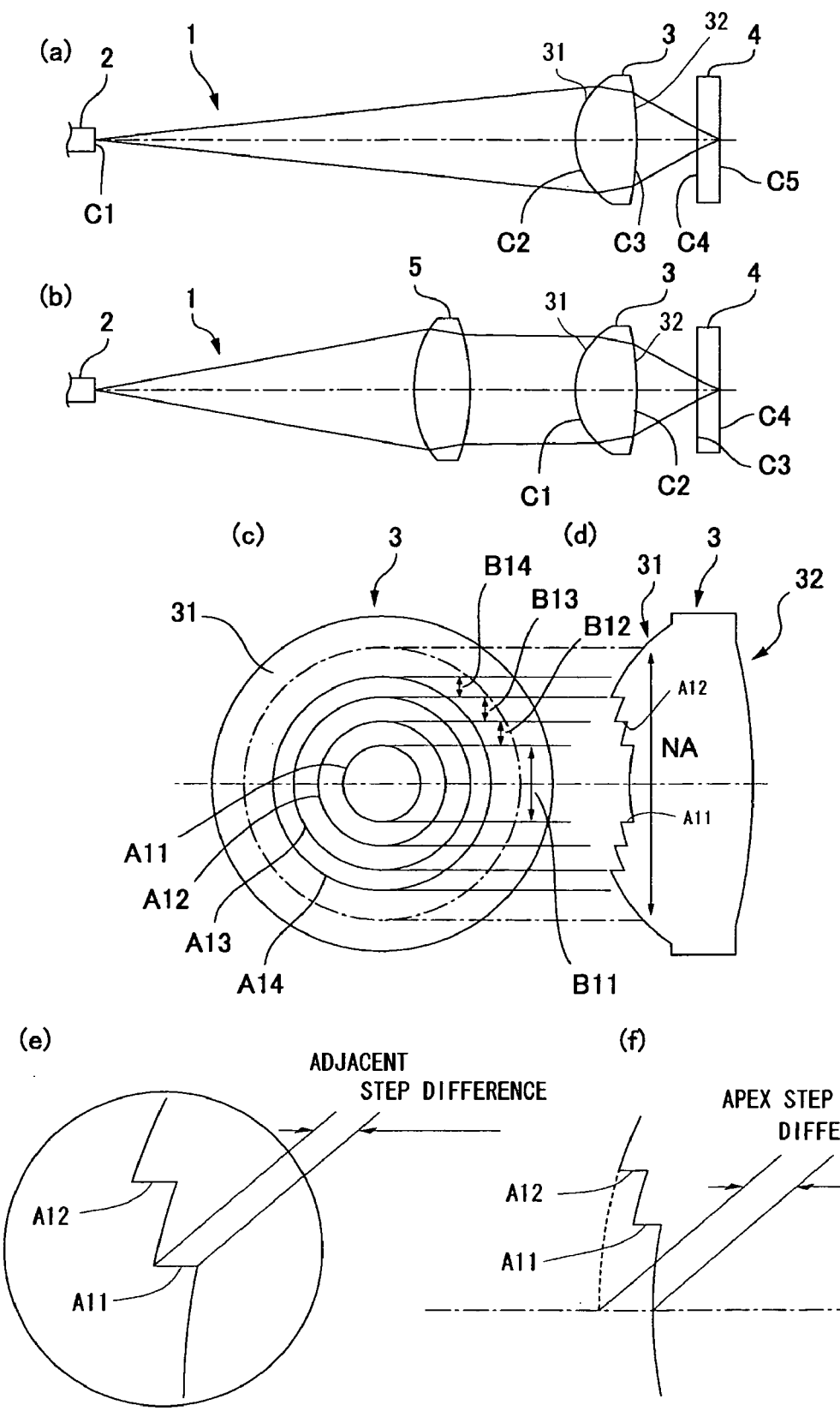
[Fig.1]

[Fig.2]
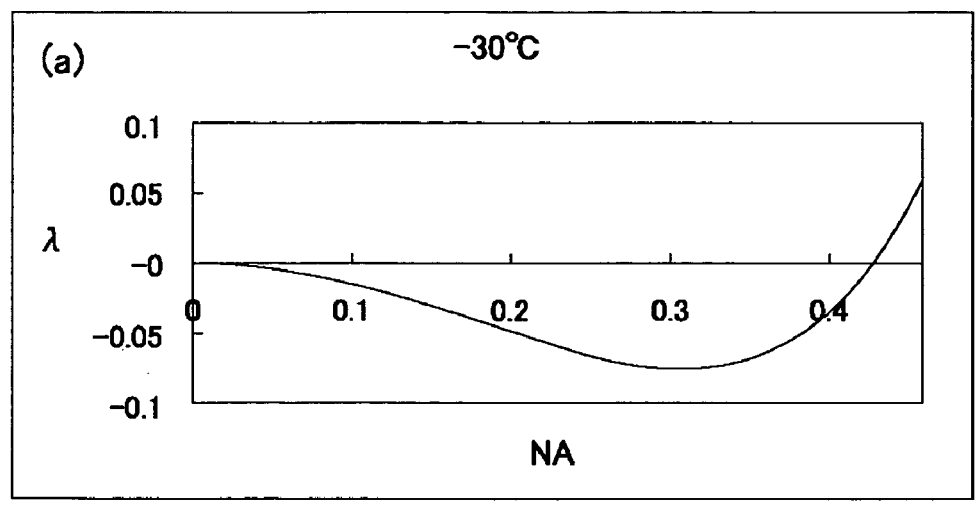
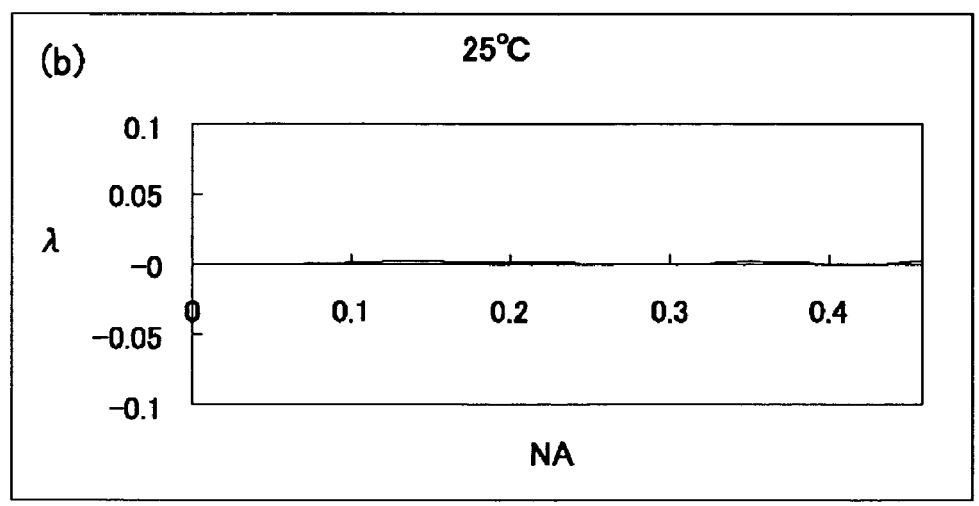
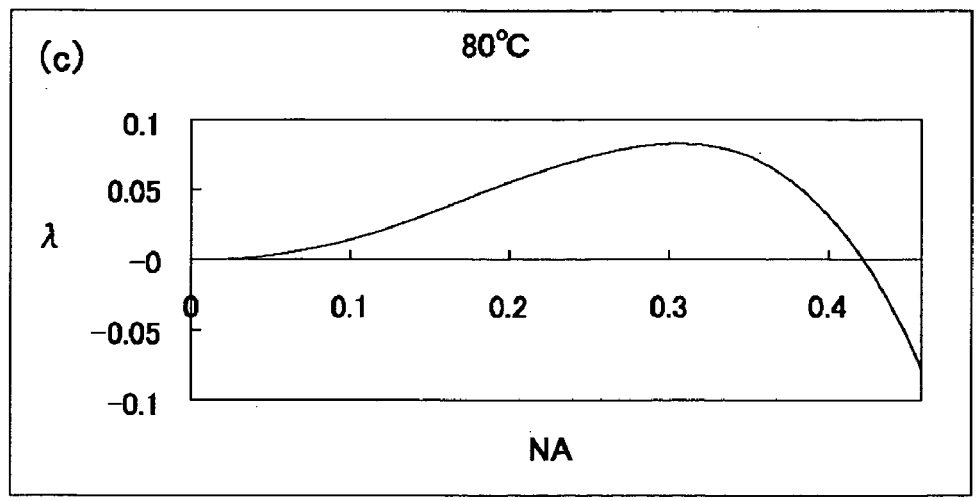

[Fig.3]
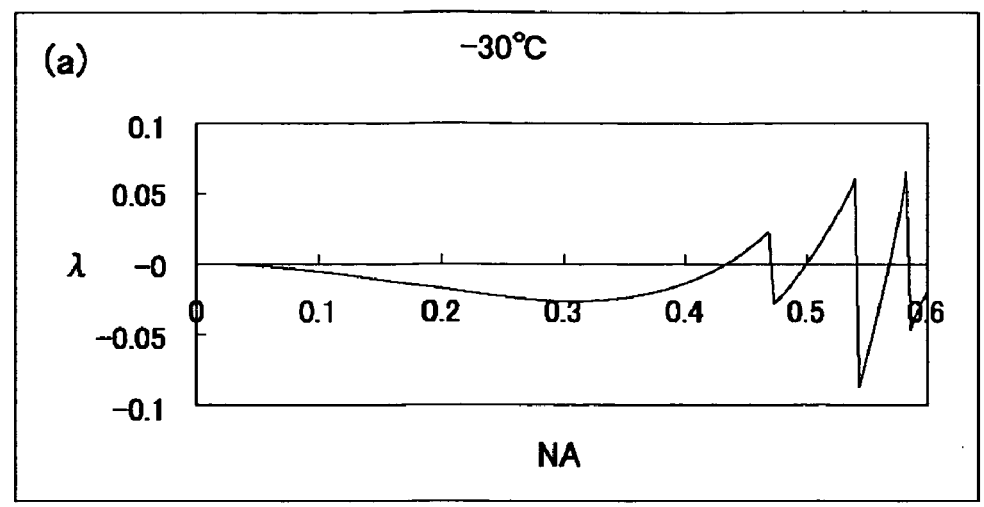
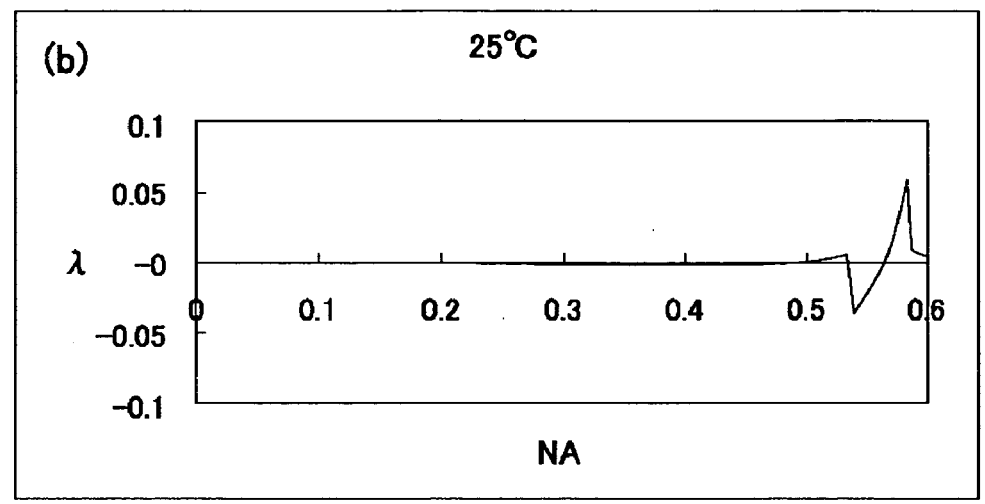
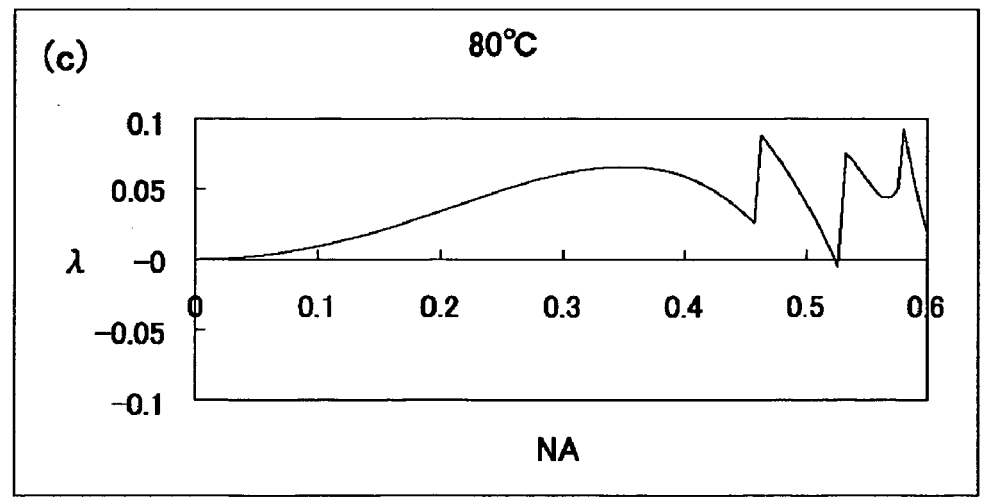

[Fig. 4]
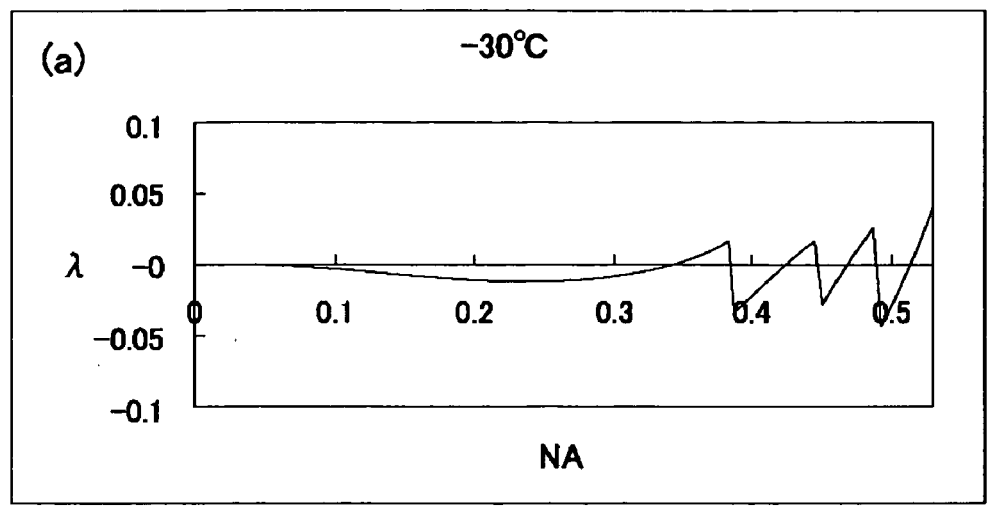
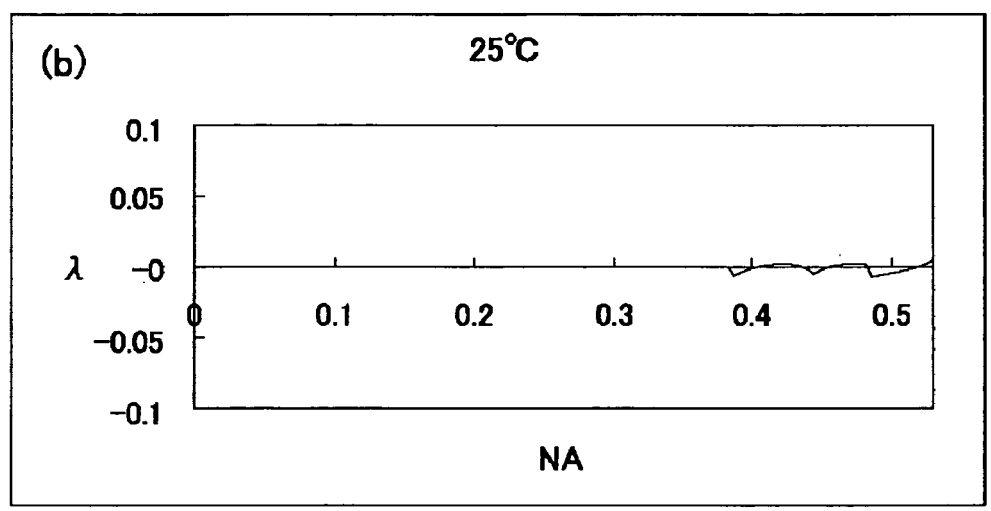
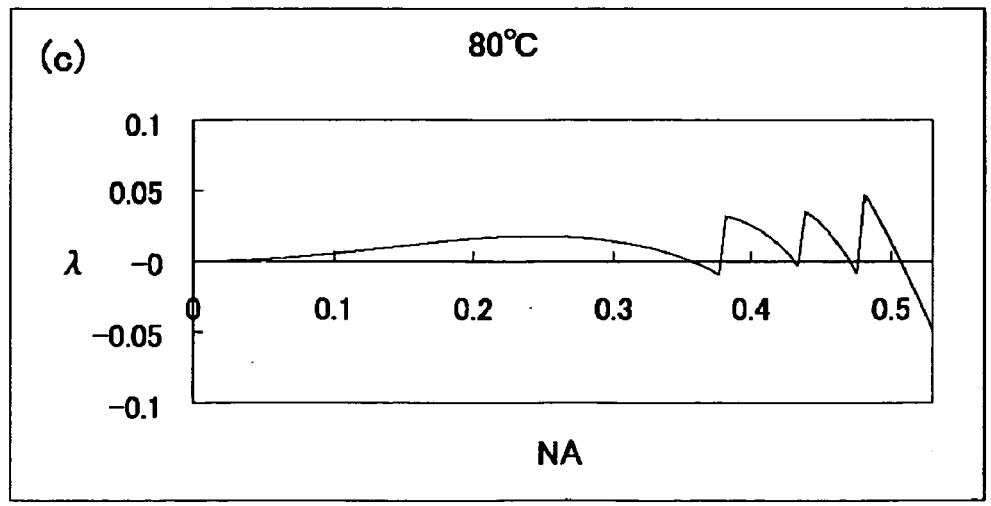

[Fig.5]
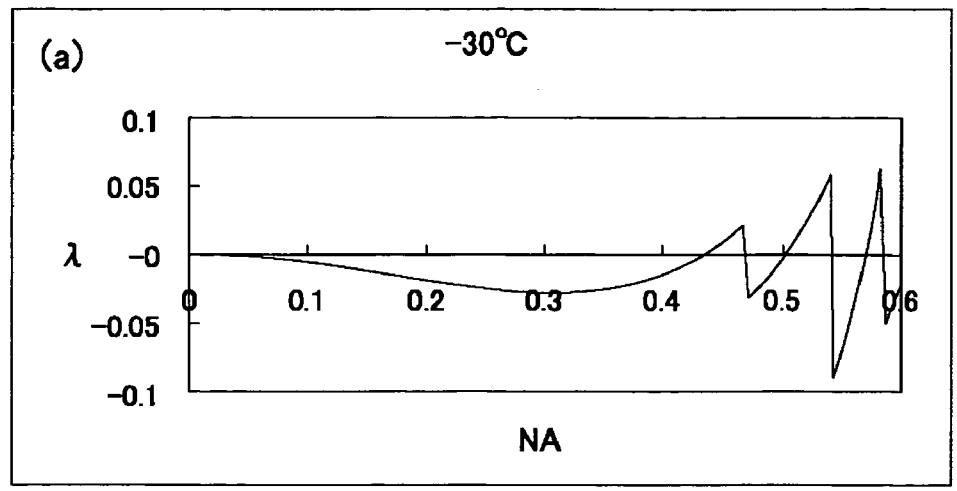
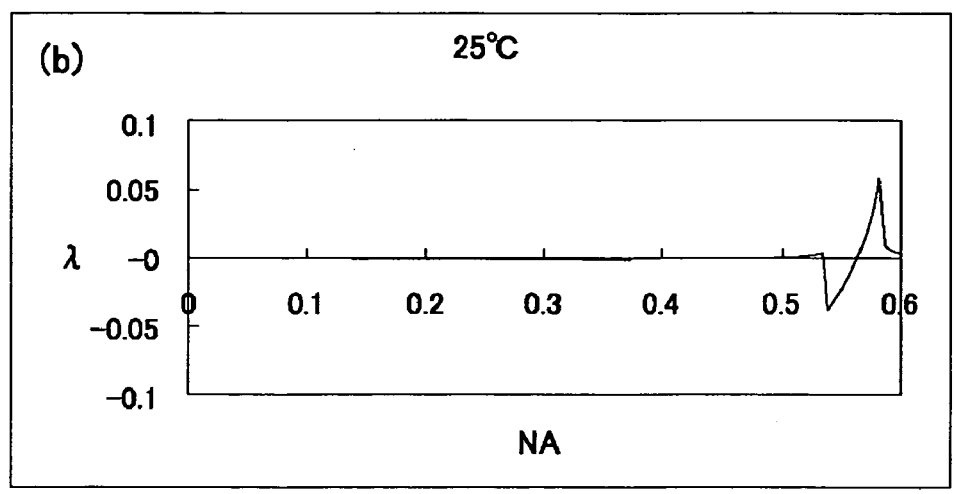
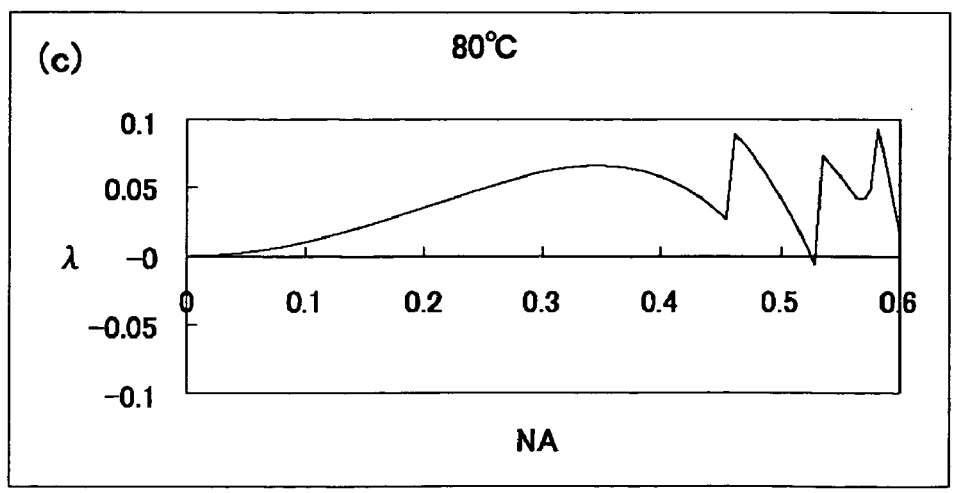

[Fig.6]
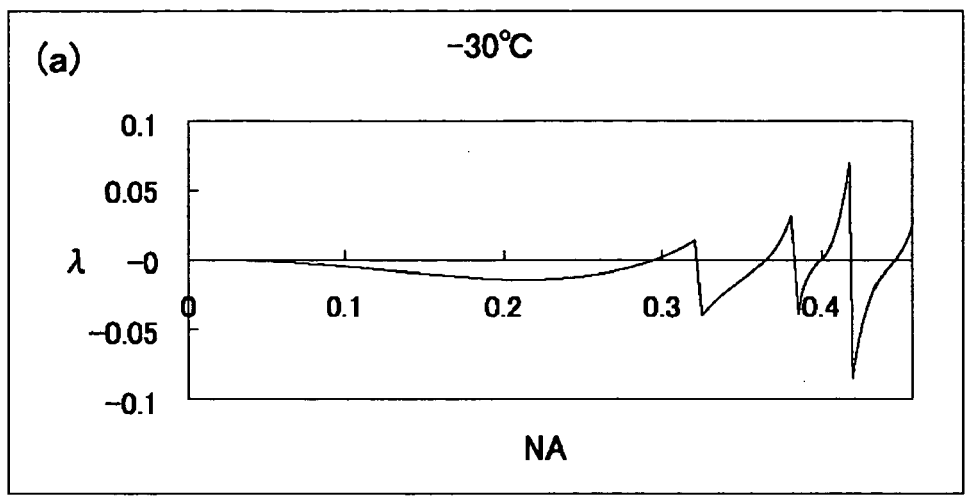
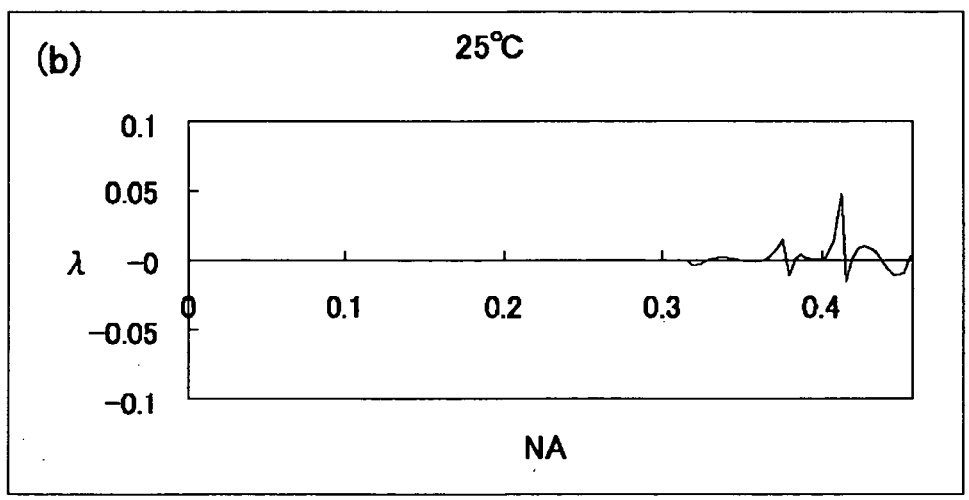
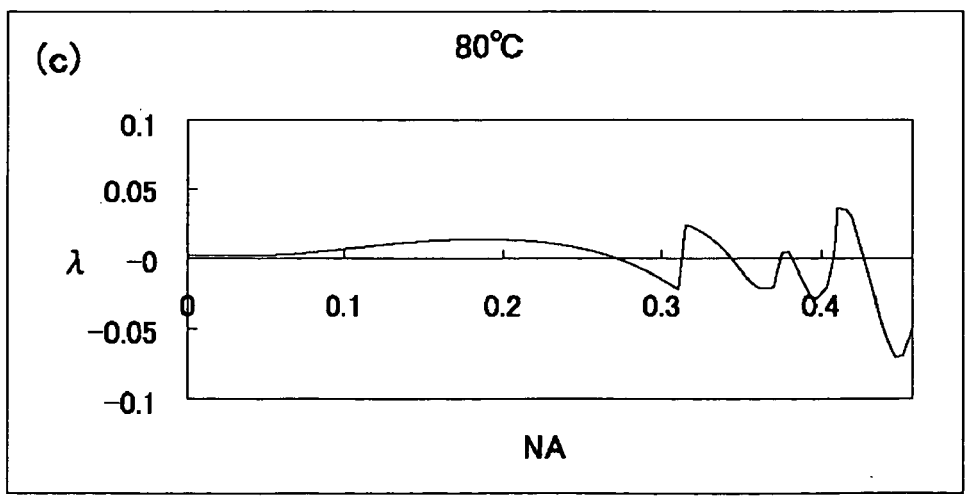

RING ZONAL PHASE CORRECTION LENS AND OPTICAL SYSTEM AND OPTICAL HEAD DEVICE

CROSS REFERENCE TO RELATED APPLICATION

The present invention claims priority under 35 U.S.C. §119 to Japanese Application No. 2004-296543 filed Oct. 8, 2004, which is incorporated herein by reference.

FIELD OF THE INVENTION

An embodiment of the present invention may relate to a ring zonal phase correction lens provided with ring zonal shaped refraction curved surfaces for correcting the phase of a laser beam, an optical system using the ring zonal phase correction lens, and a head device using the optical system.

BACKGROUND OF THE INVENTION

In an optical head device which performs recording and reproduction of information in and from an optical recording medium such as a CD or a DVD, a laser beam emitted from a semiconductor laser is converged on the recording face of the CD or the DVD through an objective lens. Conventionally, a refractive lens in a simple aspheric surface shape that is molded with resin or a lens that is formed with a diffraction pattern on its refraction face is used as the objective lens.

However, a refractive lens made of resin is commonly designed and produced such that its aberration is minimized near ordinary room temperature and thus the spherical aberration varies when an environmental temperature changes to cause the refractive index of the lens to vary or the expansion and shrinkage of the lens to occur. Therefore, jitter is deteriorated because a large spherical aberration occurs under a low-temperature environmental or a high-temperature environment. A lens made of resin is used because of cost savings even though the variation of refractive index and the expansion and shrinkage are larger than those of a glass lens. Therefore, when a lens made of resin is used, a lens with a small numerical aperture "NA" is used in order to minimize the variation of aberration while sacrificing high speed. Alternatively, a compromise in the range of its operating temperature is required.

Further, in a lens whose refraction face is provided with a diffraction pattern, a method has been proposed in which the variation of spherical aberration is cancelled by utilizing the variation of diffraction force due to the variation of wavelength. However, since a minute diffraction pattern is required to be formed in such a lens, a molding die is required to be produced by a special device.

SUMMARY OF THE INVENTION

In view of the problems described above, an embodiment of the present invention may advantageously provide a ring zonal phase correction lens whose aberration is not largely varied with environmental temperature changes even though the lens is made of resin. Further, an embodiment of the present invention may advantageously provide an optical system that uses the ring zonal phase correction lens and an optical head device which uses the optical system.

Thus, according to an embodiment of the present invention, there may be provided a ring zonal phase correction lens which is made of resin including a refraction face described below which is structurally formed on at least one of a first lens face and a second lens face. The refraction face includes three or more ring zonal shaped refraction curved surfaces which are structurally formed to be adjacent to each other through step portions structurally formed in an optical axis direction for correcting the phase of a laser beam emitted from a laser by respective ring zonal shaped refraction curved surfaces. The step portions are formed at a half or more outer area of the effective radius of the refraction face such that the lens thickness of an outer ring zonal shaped refraction curved surface becomes thicker than that of an inner ring zonal shaped refraction curved surface. Further, the variation amount of the tertiary spherical aberration due to temperature change is set to be ½ or less than that in a lens whose refraction face is formed based on the formula expressing an innermost aspheric surface without being divided.

In the ring zonal phase correction lens in accordance with an embodiment of the present invention, the spherical aberration varies according to the variation of the refractive index and the expansion/shrinkage of the lens when temperature rises. On the other hand, when temperature rises, the wavelength of the laser beam becomes longer and the spherical aberration shifts towards a positive (+) side. The spherical aberration due to temperature change remarkably occurs in the area of ½ or more of the effective diameter of the lens. Therefore, in accordance with an embodiment of the present invention, the refraction face are divided into three or more ring zonal shaped refraction curved surfaces and step portions are formed at a half or more outer area location of the effective radius of the refraction face such that the lens thickness of an outer ring zonal shaped refraction curved surface becomes thicker than that of an inner ring zonal shaped refraction curved surface. According to the ring zonal phase correction lens in accordance with an embodiment of the present invention, the ring zonal phase correction lens is constructed so that the spherical aberration which varies due to the variation of refractive index and the expansion and shrinkage of the ring zonal phase correction lens is to be cancelled by the spherical aberration due to the wavelength of laser beam getting longer when temperature rises. In other words, in the step portion, the difference of optical path length is present which is described as the following expression:

(the height of the step portion×(refractive index n−1))

This difference of the optical path length is set to be substantially integral multiples of the wavelength of the laser beam at a room temperature, and thus the wavefront aberration does not occur. However, when temperature changes, the wavelength of the laser beam varies and is shifted from substantially integral multiples of the wavelength. Therefore, the wavefront aberration caused by the above-mentioned shift due to the wavelength of the laser beam cancels the spherical aberration due to the variation of refractive index and the expansion and shrinkage when temperature changes. Consequently, the tertiary spherical aberration can be restricted with only the refraction face over a wide range of temperature, for example, −30° C.~+ 80° C., and a similar characteristic to that at an ordinary room temperature can be obtained.

In accordance with an embodiment of the present invention, it is preferable that a numerical aperture "NA" of the ring zonal phase correction lens satisfies a following expression: NA>0.45 and the absolute value of the tertiary spherical aberration of the ring zonal phase correction lens is 0.015 λrms or less in a temperature range of −30° C.<t<80° C. (t: temperature).

In accordance with an embodiment of the present invention, it is preferable that a following expression is satisfied:

($W$/effective radius of the refraction face)>0.05 wherein "W" is the average value of the width dimensions of the ring zonal shaped refraction curved surfaces except the innermost ring zonal shaped refraction curved surface. The wavefront aberration can be restricted by increasing the number of the ring zonal shaped refraction curved surfaces. However, when the number of the step portions increases, the losses in the step portions increase and the utilization efficiency of the light beam lowers like the diffraction method. However, when the width of the ring zonal shaped refraction curved surface is set to exceed a certain width, the number of the ring zonal shaped refraction curved surfaces, i.e., the number of the step portions decreases and thus the loss in the step portions is reduced and a high degree of utilization efficiency of the light beam can be obtained. Further, when a molding die for molding a lens is produced, required working for forming the step portions is reduced. Consequently, the effect of being formed rounded at the time of working the step portions can be reduced. Further, even though a sharp cutting tool is not used to work the step portion, a molding die can be produced with a normal working machine for aspherical surface.

According to an embodiment of the present invention, there may be provided an optical system including the ring zonal phase correction lens described above and a laser having such a characteristic that the wavelength of an emitted laser beam shifts on a longer wavelength side when temperature rises. In this optical system, the following expression is satisfied:

($T \times (n-1) \times K$/wavelength)>1.5 wherein "K" (nm/° C.) is the variation amount of wavelength of the laser beam per temperature of 1° C. and "T" is the absolute value of a total of adjacent step differences in which the lens thickness of an outer ring zonal refractive curved surface is thicker than that of an inner ring zonal refractive curved surface and "n" is the refractive index of the lens.

The optical system in accordance with an embodiment of the present invention may be used in an optical head device or the like.

As described above, in the ring zonal phase correction lens in accordance with an embodiment of the present invention, the refraction face is divided into three or more ring zonal shaped refraction curved surfaces and step portions are formed at a half or more outer area location of the effective radius of the refraction face such that the lens thickness of an outer ring zonal shaped refraction curved surface becomes thicker than that of an inner ring zonal shaped refraction curved surface. Therefore, the spherical aberration, which varies due to the variation of refractive index and the expansion and shrinkage of the ring zonal phase correction lens, can be cancelled by the spherical aberration due to the wavelength of laser beam getting longer when temperature rises and thus a similar characteristic to that at an ordinary temperature for example 25° C. or a room temperature can be obtained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(a) is an explanatory view showing a structure of an optical head device in a finite conjugate system which is provided with a ring zonal phase correction lens in accordance with an embodiment of the present invention, FIG. 1(b) is an explanatory view showing a structure of an optical head device in an infinite conjugate system which is provided with a ring zonal phase correction lens in accordance with an embodiment of the present invention, FIG. 1(c) is a front view showing a ring zonal phase correction lens in accordance with an embodiment of the present invention, FIG. 1(d) is a cross-sectional view of the ring zonal phase correction lens shown in FIG. 1(c), FIG. 1(e) is an explanatory view showing an adjacent step difference in a ring zonal phase correction lens in accordance with an embodiment of the present invention, and FIG. 1(f) is an explanatory view of an apex step difference of the ring zonal phase correction lens.

FIGS. 2(a), 2(b) and 2(c) are graphs showing spherical aberrations of a lens in accordance with a comparison example to the present invention at temperatures of −30° C., 25° C., 80° C.

FIGS. 3(a), 3(b) and 3(c) are graphs showing spherical aberrations of a ring zonal phase correction lens in accordance with a first embodiment of the present invention at temperatures of −30° C., 25° C., 80° C.

FIGS. 4(a), 4(b) and 4(c) are graphs showing spherical aberrations of a ring zonal phase correction lens in accordance with a second embodiment of the present invention at temperatures of −30° C., 25° C., 80° C.

FIGS. 5(a), 5(b) and 5(c) are graphs showing spherical aberrations of a ring zonal phase correction lens in accordance with a third embodiment of the present invention at temperatures of −30° C., 25° C., 80° C.

FIGS. 6(a), 6(b) and 6(c) are graphs showing spherical aberrations of a ring zonal phase correction lens in accordance with a fourth embodiment of the present invention at temperatures of −30° C., 25° C., 80° C.

DETAILED DESCRIPTION OF THE PREFERRED EMBODIMENTS

A ring zonal phase correction lens in accordance with an embodiment of the present invention and an optical head device in which this lens is used as an objective lens will be described below with reference to the accompanying drawings.

FIG. 1(a) is an explanatory view showing a structure of an optical head device in a finite conjugate system which is provided with a ring zonal phase correction lens to which the present invention is applied, FIG. 1(b) is an explanatory view showing a structure of an optical head device in an infinite conjugate system which is provided with a ring zonal phase correction lens to which the present invention is applied, FIG. 1(c) is a front view showing a ring zonal phase correction lens to which the present invention is applied, FIG. 1(d) is its cross-sectional view of the ring zonal phase correction lens, FIG. 1(e) is an explanatory view showing an adjacent step difference of a ring zonal phase correction lens to which the present invention is applied, and FIG. 1(f) is an explanatory view of an apex step difference of the ring zonal phase correction lens.

As shown in FIGS. 1(a) and 1(b), an optical head device 1 in accordance with an embodiment of the present invention performs reproduction or recording of information on or from an optical recording medium 4 such as a DVD, a CD and a CD-R. The optical head device 1 is provided with a semiconductor or other type of laser 2 for emitting a laser beam with a specified wavelength and an objective lens 3 made of resin for converging the laser beam emitted from the semiconductor laser 2 on the recording surface of the optical recording medium 4. Further, the optical head device 1 also includes a light receiving element for detecting the return light beam of the laser light beam which is reflected by the optical recording medium 4, an optical path splitting element for guiding the return light beam reflected by the optical recording medium 4 to the light receiving element and the like (not shown in the drawing).

Such optical systems are roughly classified to a finite conjugate system which is not provided with a collimator lens at a midway position of an optical path as shown in FIG. 1(a) and to an infinite conjugate system in which a collimator lens 5 is disposed at a midway position of an optical path as shown in FIG. 1(b).

The respective faces in the finite conjugate system are as follows:
the first face "C1"; the semiconductor laser;
the second face "C2"; the first lens face 31 of the objective lens 3;
the third face "C3"; the second lens face 32 of the objective lens 3;
the fourth face "C4"; the surface of the optical recording medium 4; and
the fifth face "C5"; the recording face of the optical recording medium 4.

The respective faces in the infinite conjugate system are as follows:
the first face "C1"; the first lens face 31 of the objective lens 3;
the second face "C2"; the second lens face 32 of the objective lens 3;
the third face "C3"; the surface of the optical recording medium 4; and
the fourth face "C4"; the recording face of the optical recording medium 4.

In an embodiment of the present invention, a ring zonal phase correction lens made of resin shown in FIGS. 1(c) and 1(d) is used as the objective lens 3. The ring zonal phase correction lens is provided with a refraction face formed with a plurality of ring zonal refractive curved surfaces that are adjacent to each other over a step portion in an optical axis direction on at least one of the first lens face 31 and the second lens face 32. In the ring zonal phase correction lens shown in FIGS. 1(c) and 1(d), the first lens face 31 on the incident side is formed in a refraction face provided with a plurality of ring zonal refractive curved surfaces B11, B12, B13, B14 which are adjacent to each other over step portions A11, A12, A13 in the optical axis direction. The phase of the laser beam emitted from the semiconductor laser 2 is corrected by the respective ring zonal refractive curved surfaces B11, B12, B13, B14. The ring zonal refractive curved surfaces and the step portions may be formed on the second lens face 32. In the specification of the present application, the dimension (width) of the step portions A11, A12, A13 which are formed between the adjacent ring zonal refractive curved surfaces B11, B12, B13, B14 is defined as "adjacent step difference" as shown in FIG. 1(e). Further, the dimension between the apex on the optical axis when the adjacent ring zonal refractive curved surfaces B11, B12, B13, B14 are extended to the optical axis and the apex of the innermost refractive curved surface is defined as "apex step difference" as shown in FIG. 1(f).

In the ring zonal phase correction lens structured as described above in accordance with an embodiment of the present invention, the first lens face 31 (refraction face) is divided into three or more ring zonal refractive curved surfaces B11, B12, B13, B14 as concrete embodiments are described below. The step portions A11, A12, A13, each of which makes the lens thickness of an outer ring zonal refractive curved surface thicker than that of an inner ring zonal refractive curved surface, are formed on an outer region of ½ or more of the effective radius of the first lens face 31. In this case, the variation of the tertiary spherical aberration due to the variation of temperature becomes ½ or less in comparison with the case that the first lens face 31 is formed with a formula expressing only the innermost aspherical surface without being divided.

Further, the semiconductor laser 2 is provided with a characteristic that the wavelength of an emitted laser beam shifts on the longer wavelength side when temperature rises. When the variation amount of the wavelength of a laser beam per temperature of 1° C. is set to be "K" (nm/° C.) and the absolute value of a total of the adjacent step differences in which the lens thickness of an outer ring zonal refractive curved surface is thicker than that of the inner ring zonal refractive curved surface among the step portions is set to be "T", "T" and "n" satisfy the following expression;

$(T \times (n-1) \times K / \text{wavelength}) > 1.5$ wherein "n" is the refractive index of the lens.

Therefore, when the temperature varies, the wavelength of a laser beam varies to shift from an approximately integer multiple of wavelength and thus the wavefront aberration generated by this shift cancels the spherical aberration generated by the variation of temperature. As a result, according to an embodiment of the present invention, the tertiary spherical aberration can be restrained by only the refraction face over a wide range of temperature, for example, −30° C.~+80° C. and thus the similar characteristic as that at ordinary temperature can be obtained for example at 25° C. or a room temperature, however, this is only an exemplary example.

Further, in an embodiment of the present invention, when the numerical aperture is set to be "NA", the "NA" satisfies the following expression:

$NA > 0.45$

In addition, when the temperature is set to be "t", the absolute value of the tertiary spherical aberration is 0.015 λrms or less in the following range of temperature:

$-30° C. < t < 80° C.$

In addition, when the average value of the width dimensions of the ring zonal refractive curved surfaces B12, B13, B14 except the innermost ring zonal refractive curved surface B11 is set to be "W", the following expression is satisfied:

$W / \text{effective radius of refraction face} > 0.05$

In accordance with an embodiment of the present invention constructed as described above, since the number of the ring zonal refractive curved surfaces, i.e., the number of the step portions is smaller, the loss in the step portions can be restrained lower and thus utilization efficiency of the light beam becomes higher. Further, when a molding die for molding a lens is produced, required working to the step portions can be reduced. Accordingly, the effect of being rounded occurred at the time of processing the step portion can be reduced. Further, a sharp cutting tool is not required to be used to work the step portion and a molding die can be produced with a normal working machine for aspherical surface.

In the following lens design data of a comparison example and embodiments of the present invention, the aspheric surface shape Z(r) of the lens face 31 is rotationally symmetrical and expressed with respect to a radial coordinate "r" as follows.

$$Z(r)=cr^2/[1+\{1-(1+k)\,c^2r^2\}^{1/2}]+A_2 \cdot r^2+A_4 \cdot r^4+A_6 \cdot r^6+\cdots$$

wherein, c: the inverse number of the radius of curvature "R", k: the cone constant, $A_2$, $A_4$, $A_6$ . . . : the second, the fourth, the sixth, . . . aspherical surface coefficient respectively. In the expression of the aspherical surface coefficient, A-4, A-6, A-8 . . . respectively means $A_4$, $A_6$, $A_8$ . . . and the number "m" continuing the "E" means $1\times10^m$. In the data described below, respective ring-shaped zone data are described in order from the innermost peripheral portion to the outer peripheral side. Further, the apex step difference is shown with the notational symbol of "−" (minus) when the lens thickness of the ring zonal refractive curved surface on the outer peripheral side is thicker than that on the inner peripheral side. On the contrary, when the lens thickness of the ring zonal refractive curved surface on the outer peripheral side is thicker than that on the inner peripheral side, the value of the adjacent step difference of the adjacent step portion is positive.

COMPARISON EXAMPLE

The structure of a lens in the comparison example will be described below. The comparison example corresponds to a lens that its refraction face is formed with only the formula expressing the innermost aspherical surface without being divided. The characteristics at −30° C., 25° C. 80° C. when the lens in the comparison example is used as an objective lens of a finite conjugate system are shown in FIGS. 2(a), 2(b) and 2(c).
f=2.62
λ=780 nm
NA=0.46
K=0.27 nm/° C.
Coefficient of Linear Expansion: $6\times10^{-5}$ cm/cm° C.

(Optical System)

|  | Radius of Curvature | Distance | Refractive Index | | |
|---|---|---|---|---|---|
|  |  |  | 25° C. 780 nm | −30° C. 765 nm | 80° C. 795 nm |
| First Face | 0.00000 | 15.65 | 1.00000 | 1.00000 | 1.00000 |
| Second Face | 1.85827 | 1.50 | 1.51913 | 1.52491 | 1.51276 |
| Third Face | −3.68962 | 1.65 | 1.00000 | 1.00000 | 1.00000 |
| Fourth Face | 0.00000 | 1.20 | 1.57238 | 1.57983 | 1.56358 |
| Fifth Face | 0.00000 |  | 1.00000 | 1.00000 | 1.00000 |

(Lens Design Data)
The first lens surface; aspheric surface shape
R=1.85827
k=−0.344578E+00
A-4=−0.965394E−02
A-6=−0.973300E−03
A-8=0.359506E−04
A-10=−0.184903E−03
The second lens surface; aspheric surface shape
R=−3.68962
k=−0.91720E+01
A-4=0.447168E−03
A-6=0.256283E−02
A-8=−0.181727E−02
A-10=0.281000E−03

(Results)
The relationship of temperature and the tertiary spherical aberration in the objective lens according to the comparison example are as follows.

| Temperature | Wavefront Aberration | Tertiary spherical aberration(λrms) |
|---|---|---|
| −30° C. | 0.032 | 0.032 |
| 25° C. | 0.000 | 0.000 |
| 80° C. | 0.037 | −0.037 |

First Embodiment

The characteristics at −30° C., 25° C., 80° C. when the lens in accordance with a first embodiment of the present invention is used as an objective lens of a finite conjugate system are shown in FIGS. 3(a), 3(b) and 3(c).
f=2.62
λ=780 nm
NA=0.46
K=0.27 nm/° C.
Coefficient of Linear Expansion $6\times10^{-5}$ cm/cm° C.
Conditional Expression (T×(n−1)×K/wavelength)=2.2

(Optical System)

|  | Radius of Curvature | Distance | Refractive Index | | |
|---|---|---|---|---|---|
|  |  |  | 25° C. 780 nm | −30° C. 765 nm | 80° C. 795 nm |
| First Face | 0.00000 | 15.65 | 1.00000 | 1.00000 | 1.00000 |
| Second Face | 1.85827 | 1.50 | 1.51913 | 1.52491 | 1.51276 |
| Third Face | −3.68962 | 1.65 | 1.00000 | 1.00000 | 1.00000 |
| Fourth Face | 0.00000 | 1.20 | 1.57238 | 1.57983 | 1.56358 |
| Fifth Face | 0.00000 |  | 1.00000 | 1.00000 | 1.00000 |

(Lens Design Data)
The first lens surface Aspheric surface shape
Radius of Ring-shaped Zone=1.00000
Apex Step Difference=0.00000
R=1.85827
k1=−0.344578E+00
A1-4=−0.965394E−02
A1-6=−0.973300E−03
A1-8=0.359506E−04
A1-10=−0.184903E−03
Adjacent Step Difference=0.00307

Radius of Ring-shaped Zone=1.20000
Apex Step Difference=−0.00145
R=1.88507
k2=−0.387393E+00
A2-4=−0.897516E-02
A2-6=0.751439E-02
A2-8=−0.738029E-02
A2-10=0.186018E-02
Adjacent Step Difference=0.00314
Radius of Ring-shaped Zone=1.32000
Apex Step Difference=−0.01521
R=1.83336
k3=−0.321876E+00
A3-4=−0.788244E-02
A3-6=0.830224E-02
A3-8=−0.117442E-01
A3-10=0.307881E-02
Adjacent Step Difference=0.00637
Radius of Ring-shaped Zone=1.85610
Apex Step Difference=−0.01824
R=1.82468
k4=−0.323170E+00
A4-4=−0.163399E-01
A4-6=0.724155E-02
A4-8=−0.494129E-02
A4-10=0.726214E-03
The second lens surface: Aspheric surface shape
R=−3.68962
k=−0.91720E+01
A-4=0.447168E-03
A-6=0.256283E-02
A-8=−0.181727E-02
A-10=0.281000E-03

(Results)

The relationship of temperature and the tertiary spherical aberration in the objective lens in accordance with the first embodiment of the present invention are as follows.

| Temperature | Wavefront Aberration | Tertiary spherical aberration($\lambda$rms) |
|---|---|---|
| −30° C. | 0.021 | 0.001 |
| 25° C. | 0.006 | −0.001 |
| 80° C. | 0.021 | −0.010 |

As described above, in the ring zonal phase correction lens in accordance with the first embodiment of the present invention, the variation amount of the tertiary spherical aberration due to temperature variation is ½ or less than that of the comparison example whose refraction face is formed only with the expression of the innermost aspheric surface without being divided. Further, the absolute value of the tertiary spherical aberration is 0.015 $\lambda$rms or less in the temperature range of −30° C.~80° C.

Second Embodiment

The characteristics at −30° C., 25° C., 80° C. when the lens in accordance with a second embodiment of the present invention is used as an objective lens of an infinite conjugate system are shown in FIGS. 4(a), 4(b) and 4(c).
f=3.4
$\lambda$=780
NA=0.53
K=0.25 nm/° C.
Coefficient of Linear Expansion 6×10$^{-5}$ cm/cm° C.
Conditional Expression (T×(n−1)×K/wavelength)=1.9

(Optical System)

| | Radius of Curvature | Distance | Refractive Index | | |
| | | | 25° C. 780 nm | −30° C. 765 nm | 80° C. 795 nm |
|---|---|---|---|---|---|
| First Face | 2.12374 | 1.60 | 1.52499 | 1.53019 | 1.51912 |
| Second Face | −7.91494 | 1.75 | 1.00000 | 1.00000 | 1.00000 |
| Third Face | 0.00000 | 1.20 | 1.57238 | 1.57980 | 1.56361 |
| Fourth Face | 0.00000 | | 1.00000 | 1.00000 | 1.00000 |

(Lens Design Data)
The first lens surface: Aspheric surface shape
Radius of Ring-shaped Zone=1.30000
Apex Step Difference=0.00000
R=2.12374
k1=−0.101153E+01
A1-4=0.718465E-02
A1-6=0.196934E-03
A1-8=0.177540E-04
A1-10=−0.608838E-05
Adjacent Step Difference=0.00318
Radius of Ring-shaped Zone=1.50000
Apex Step Difference=−0.00359
R=2.11897
k 2=−0.101153E+01
A2-4=0.699128E-02
A2-6=0.205894E-03
A2-8=0.177540E-04
A2-10=−0.608838E-05
Adjacent Step Difference=0.00326
Radius of Ring-shaped Zone=1.65000
Apex Step Difference=−0.01019
R=2.08325
k3=−0.101153E+01
A3-4=0.536438E-02
A3-6=0.423921E-03
A3-8=0.177540E-04
A3-10=−0.608838E-05
Adjacent Step Difference=0.00502
Radius of Ring-shaped Zone=1.85000
Apex Step Difference=−0.01080
R=2.12374
k4=−0.101153E+01
A4-4=0.700315E-02
A4-6=0.215630E-03
A4-8=0.177540E-04
A4-10=−0.608838E-05
The second lens surface: Aspheric surface shape
R=−7.91494
k=−0.38794E+02
A-2=0.284111E-02
A-4=0.240191E-02
A-6=−0.599799E-03
A-8=0.501954E-04
A-10=−0.126791E-06

(Results)

The relationship of temperature and the tertiary spherical aberration in the objective lens in accordance with the second embodiment of the present invention are as follows.

| Temperature | Wavefront Aberration | Tertiary spherical aberration($\lambda$rms) |
|---|---|---|
| −30° C. | 0.015 | 0.003 |
| 25° C. | 0.002 | 0.000 |
| 80° C. | 0.016 | −0.008 |

As described above, in the ring zonal phase correction lens in accordance with the second embodiment of the present invention, the variation amount of the tertiary spherical aberration due to temperature variation is ½ or less than that of the comparison example whose refraction face is formed based on only the expression of the innermost aspheric surface without being divided. Further, the absolute value of the tertiary spherical aberration is 0.015 $\lambda$rms or less in the temperature range of −30° C.~80° C.

Third Embodiment

The characteristics at −30° C., 25° C., 80° C. when the lens constructed in the following conditions in accordance with a third embodiment of the present invention is used as an objective lens of an infinite conjugate system are shown in FIGS. 5(a), 5(b) and 5(c).
f=3.0
$\lambda$=655 n m
NA=0.6
K=0.2 nm/° C.
Coefficient of Linear Expansion 7×10⁻⁵ cm/cm° C.
Conditional Expression (T×(n−1)×K/wavelength)=3.3

(Optical System)

| | | Refractive Index | | |
|---|---|---|---|---|
| | Radius of Curvature | Distance | 25° C. 655 nm | −30° C. 644 nm | 80° C. 666 nm |
| First Face | 1.87382 | 1.75 | 1.54064 | 1.54447 | 1.53463 |
| Second Face | −8.14441 | 1.64 | 1.00000 | 1.00000 | 1.00000 |
| Third Face | 0.00000 | 0.60 | 1.57824 | 1.58601 | 1.56912 |
| Fourth Face | 0.00000 | | 1.00000 | 1.00000 | 1.00000 |

(Lens Design Data)
The first lens surface: Aspheric surface shape
Radius of Ring-shaped Zone=1.40000
Apex Step Difference=0.00000
R=1.87382
k1=−0.103847E+01
A 1−4=0.102800E−01
A 1−6=0.621703E−03
A 1−8=0.457556E−04
A 1−10=0.909323E−05
A 1−12=−0.533372E−06
Adjacent Step Difference=0.00405
Radius of Ring-shaped Zone=1.62000
Apex Step Difference=−0.00373
R=1.87382
k2=−0.103917E+01
A2−4=0.100273E−01
A2−6=0.796436E−03
A2−8=0.118799E−05
A2−10=0.518841E−05
A2−12=0.167356E−05
Adjacent Step Difference=0.00859
Radius of Ring-shaped Zone=1.75000
Apex Step Difference=−0.01722
R=1.87024
k3=−0.103221E+01
A3−4=0.151900E−01
A3−6=−0.362686E−02
A3−8=0.175083E−02
A3−10=−0.380942E−03
A3−12=0.387693E−04
Adjacent Step Difference=0.00743
Radius of Ring-shaped Zone=2.00000
Apex Step Difference=−0.02580
R=1.87016
k4=−0.103135E+01
A4−4=0.144483E−01
A4−6=−0.373525E−02
A4−8=0.246716E−02
A4−10=−0.672818E−03
A4−12=0.710146E−04
The second lens surface: Aspheric surface shape
R=−8.14441
k=−0.49536E+02
A−4=0.612361E−02
A−6=−0.861128E−03
A−8=0.575377E−04
A−10=−0.967370E−06

(Results)
The relationship of temperature and the tertiary spherical aberration in the objective lens in accordance with the third embodiment of the present invention are as follows.

| Temperature | Wavefront Aberration | Tertiary spherical aberration($\lambda$rms) |
|---|---|---|
| −30° C. | 0.028 | 0.000 |
| 25° C. | 0.010 | 0.003 |
| 80° C. | 0.022 | −0.006 |

As described above, in the ring zonal phase correction lens in accordance with the third embodiment of the present invention, the variation amount of the tertiary spherical aberration due to temperature change is ½ or less than that of the comparison example whose refraction face is formed based on the formula expressing only the innermost aspheric surface without being divided. Further, the absolute value of the tertiary spherical aberration is 0.015 $\lambda$rms or less in the temperature range of −30° C.~80° C.

Fourth Embodiment

The characteristics at −30° C., 25° C., 80° C. when the lens constructed in the following conditions in accordance with a fourth embodiment of the present invention is used as an objective lens of an infinite conjugate system are shown in FIGS. 6(a), 6(b) and 6(c).
f=2.62
$\lambda$=780 nm
NA=0.46
K=0.15 nm/° C.
Coefficient of Linear Expansion 6×10⁻⁵ cm/cm° C.
Conditional Expression (T×(n−1)×K/wavelength)=1.9

(Optical System)

|  | Radius of Curvature | Distance | Refractive Index | | |
|---|---|---|---|---|---|
|  |  |  | 25° C. 780 nm | −30° C. 772 nm | 80° C. 788 nm |
| First Face | 0.00000 | 15.65 | 1.00000 | 1.00000 | 1.00000 |
| Second Face | 1.85827 | 1.50 | 1.51913 | 1.52476 | 1.51290 |
| Third Face | −3.68962 | 1.65 | 1.00000 | 1.00000 | 1.00000 |
| Fourth Face | 0.00000 | 1.20 | 1.57238 | 1.57961 | 1.56376 |
| Fifth Face | 0.00000 |  | 1.00000 | 1.00000 | 1.00000 |

(Lens Design Data)
 The first lens surface: Aspheric surface shape
 Radius of Ring-shaped Zone=1.00000
 Apex Step Difference=0.00000
 R=1.85827
 $k_1$=−0.344578E+00
 $A1-4$=−0.965394E−02
 $A1-6$=−0.973300E−03
 $A1-8$=0.359506E−04
 $A1-10$=−0.184903E−03
 Adjacent Step Difference=0.00462
 Radius of Ring-shaped Zone=1.20000
 Apex Step Difference=−0.00316
 R=1.88514
 $k_2$=−0.387389E+00
 $A2-4$=−0.872489E−02
 $A2-6$=0.796437E−02
 $A2-8$=−0.821551E−02
 $A2-10$=0.216747E−02
 Adjacent Step Difference=0.00472
 Radius of Ring-shaped Zone=1.32000
 Apex Step Difference=−0.02212
 R=1.83275
 $k_3$=−0.321735E+00
 $A3-4$=−0.363852E−02
 $A3-6$=0.100096E−01
 $A3-8$=−0.160570E−01
 $A3-10$=0.441230E−02
 Adjacent Step Difference=0.00957
 Radius of Ring-shaped Zone=1.85610
 Apex Step Difference=−0.02715
 R=1.81824
 $k_4$=−0.323170E+00
 $A4-4$=−0.164982E−01
 $A4-6$=0.933401E−02
 $A4-8$=−0.670466E−02
 $A4-10$=0.109637E−02
 The second lens surface: Aspheric surface shape
 R=−3.68962
 k=−0.91720E+01
 $A-4$=0.447168E−03
 $A-6$=0.256283E−02
 $A-8$=−0.181727E−02
 $A-10$=0.281000E−03

(Results)
 The relationship of temperature and the tertiary spherical aberration in the objective lens in accordance with the fourth embodiment of the present invention are as follows.

| Temperature | Wavefront Aberration | Tertiary spherical aberration($\lambda$rms) |
|---|---|---|
| −30° C. | 0.022 | 0.000 |
| 25° C. | 0.009 | −0.001 |
| 80° C. | 0.021 | −0.009 |

As described above, in the ring zonal phase correction lens in accordance with the fourth embodiment of the present invention, the variation amount of the tertiary spherical aberration due to temperature change is ½ or less than that of the comparison example whose refraction face is formed based on the formula expressing only the innermost aspheric surface without being divided. Further, the absolute value of the tertiary spherical aberration is 0.015 $\lambda$rms or less in the temperature range of −30° C.~80° C.

Other Embodiments

In the embodiments described above, a laser beam with the wavelength of about 655 nm or a laser beam with the wavelength of about 785 nm is used. However, an embodiment of the present invention may be applied to a case when a laser beam with the wavelength of about 405 nm is used for a further thinner Blue-ray Disc in which the width of the surface protective layer is 0.1 mm.

Further, in the embodiments described above, the example is described in which the ring zonal phase correction lens to which the present invention is applied is used as an objective lens. However, the present invention may be applied to other lenses that are disposed on an optical axis.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A ring zonal phase correction lens for use with a laser, the lens being made of resin comprising a refraction face which is formed on at least one of a first lens face and a second lens face, the refraction face comprising:
 three or more ring zonal shaped refraction curved surfaces which are structurally formed to be adjacent to each other through step portions structurally formed in an optical axis direction for correcting a phase of a laser beam emitted from the laser by respective ring zonal shaped refraction curved surfaces;
 wherein the step portion is structurally formed such that a lens thickness of an outer ring zonal shaped refraction curved surface becomes thicker than a lens thickness of an inner ring zonal shaped refraction curved surface and the step portion is structurally formed at a half or more outer area location of an effective radius of the refraction face; wherein
 a variation amount of tertiary spherical aberration due to temperature variation is set to be ½ or less than a variation amount of tertiary spherical aberration due to temperature change in a lens whose refraction face is formed based on only a formula expressing an innermost aspheric surface without being divided.

2. The ring zonal phase correction lens according to claim 1, wherein a numerical aperture "NA" of the ring zonal phase correction lens satisfies a following expression:

NA>0.45 and an absolute value of tertiary spherical aberration of the ring zonal phase correction lens is 0.015 λrms or less in a temperature range of −30° C.<t<80° C. (t: temperature).

3. The ring zonal phase correction lens according to claim 1, wherein a following expression is satisfied:

(W/effective radius of the refraction face)>0.05 wherein "W" is an average value of width dimensions of the ring zonal shaped refraction curved surfaces except an innermost ring zonal shaped refraction curved surface.

4. An optical system comprising:
a ring zonal phase conection lens for use with a laser, the lens being made of resin comprising a refraction face which is formed on at least one of a first lens face and a second lens face, the refraction face comprising three or more ring zonal shaped refraction curved surfaces which are structurally formed to be adjacent to each other through step portions structurally formed in an optical axis direction for correcting a phase of a laser beam emitted from the laser by respective ring zonal shaped refraction curved surfaces;
wherein the step portion is structurally formed such that a lens thickness of an outer ring zonal shaped refraction curved surface becomes thicker than a lens thickness of an inner ring zonal shaped refraction curved surface and the step portion is structurally formed at a half or more outer area location of an effective radius of the refraction face;
the laser having a characteristic such that a wavelength of emitted laser beam shifts on a longer wavelength side when temperature rises;
wherein a following expression is satisfied:

(T×(n−1)×K/wavelength)>1.5 wherein:
"K" (nm/° C.) is a variation amount of wavelength of the laser beam per temperature of 1° C.;
"T" is an absolute value of a total of adjacent step portions in which a lens thickness of an outer ring zonal refractive curved surface is thicker than a lens thickness of an inner ring zonal refractive curved surface; and
"n" is a refractive index of the ring zonal phase conection lens.

5. The optical system according to claim 4, wherein a numerical aperture "NA" of the ring zonal phase correction lens satisfies a following expression:

NA>0.45 and an absolute value of tertiary spherical aberration of the ring zonal phase correction lens is 0.015 λrms or less in a temperature range of −30° C.<t<80° C. (t: temperature).

6. The optical system according to claim 4, wherein a following expression is satisfied:

(W/effective radius of the refraction face)>0.05 wherein "W" is an average value of width dimensions of the ring zonal shaped refraction curved surfaces except an innermost ring zonal shaped refraction curved surface.

7. An optical head device comprising:
an optical system comprising a ring zonal phase correction lens for use with a laser, the lens being made of resin comprising a refraction face which is formed on at least one of a first lens face and a second lens face, the refraction face comprising three or more ring zonal shaped refraction curved surfaces which are structurally formed to be adjacent to each other through step portions structurally formed in an optical axis direction for correcting a phase of a laser beam emitted from the laser by respective ring zonal shaped refraction curved surfaces;
wherein the step portion is structurally formed such that a lens thickness of an outer ring zonal shaped refraction curved surface becomes thicker than a lens thickness of an inner ring zonal shaped refraction curved surface and the step portion is structurally formed at a half or more outer area location of an effective radius of the refraction face;
the laser having a characteristic such that a wavelength of emitted laser beam shifts on a longer wavelength side when temperature rises;
wherein a following expression is satisfied:

(T×(n−1)×K/wavelength)>1.5 wherein:
"K" (nm/° C.) is a variation amount of wavelength of the laser beam per temperature of 1° C.;
"T" is an absolute value of a total of adjacent step portions in which a lens thickness of an outer ring zonal refractive curved surface is thicker than a lens thickness of an inner ring zonal refractive curved surface; and
"n" is a refractive index of the ring zonal phase correction lens.

8. The optical head device of claim 7 wherein:
a numerical aperture "NA" of the ring zonal phase correction lens satisfies a following expression:

NA>0.45 and an absolute value of tertiary spherical aberration of the ring zonal phase correction lens is 0.015 λrms or less in a temperature range of −30° C.<t<80° C. (t: temperature).

9. The optical head device of claim 7 wherein:
a following expression is satisfied:

(W/effective radius of the refraction face)>0.05 wherein "W" is an average value of width dimensions of the ring zonal shaped refraction curved surfaces except an innermost ring zonal shaped refraction curved surface.

* * * * *